United States Patent
Kang et al.

(10) Patent No.: US 9,890,249 B2
(45) Date of Patent: *Feb. 13, 2018

(54) PHOTOALIGNMENT AGENT AND LIQUID CRYSTAL DISPLAY DEVICE INCLUDING THE SAME

(71) Applicant: Samsung Display Co., Ltd., Yongin, Gyeonggi-Do (KR)

(72) Inventors: Suk Hoon Kang, Seoul (KR); Yeong Rong Park, Suwon-si (KR); Mi Hwa Lee, Seoul (KR); Jun Woo Lee, Seongnam-si (KR); Baek Kyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 538 days.

This patent is subject to a terminal disclaimer.

(21) Appl. No.: 14/479,546

(22) Filed: Sep. 8, 2014

(65) Prior Publication Data
US 2015/0240032 A1 Aug. 27, 2015

(30) Foreign Application Priority Data
Feb. 21, 2014 (KR) .................. 10-2014-0020693

(51) Int. Cl.
C09K 19/56 (2006.01)
C08G 73/10 (2006.01)
C09D 179/08 (2006.01)

(52) U.S. Cl.
CPC ..... *C08G 73/1078* (2013.01); *C08G 73/1042* (2013.01); *C09D 179/08* (2013.01)

(58) Field of Classification Search
CPC .. C09K 19/56; C08G 73/105; C08G 73/1042; C08G 73/1078; G02F 1/133711; G02F 1/133723
See application file for complete search history.

(56) References Cited

U.S. PATENT DOCUMENTS

| | | |
|---|---|---|
| 6,063,829 A | 5/2000 | Endou et al. |
| 7,075,607 B2 | 7/2006 | Kim et al. |
| 2006/0061719 A1* | 3/2006 | Tomioka ........... G02F 1/133723 349/123 |

FOREIGN PATENT DOCUMENTS

| | | |
|---|---|---|
| JP | 4821118 B2 | 9/2011 |
| JP | 5083539 B2 | 9/2012 |
| KR | 100801029 B1 | 1/2008 |
| KR | 100840669 B1 | 6/2008 |
| KR | 100851787 B1 | 8/2008 |

* cited by examiner

*Primary Examiner* — Chanceity Robinson
(74) *Attorney, Agent, or Firm* — Cantor Colburn LLP

(57) ABSTRACT

A photoalignment agent is provided. The photoalignment agent includes a copolymer of ii) at least one of a cyclobutanedianhydride (CBDA) and a cyclobutanedianhydride (CBDA) derivative, and ii) a diamine, and the diamine includes an electron donor group.

7 Claims, 5 Drawing Sheets

PHOTOALIGNMENT AGENT AND LIQUID CRYSTAL DISPLAY DEVICE INCLUDING THE SAME

This application claims priority to Korean Patent Application No. 10-2014-0020693 filed on Feb. 21, 2014, and all the benefits accruing therefrom under 35 U.S.C. §119, the content of which in its entirety is herein incorporated by reference.

BACKGROUND (a) Field

The present invention relates to a photoalignment agent and a liquid crystal display including the same.

(b) Description of the Related Art

In a liquid crystal element, to display images, that is, to switch liquid crystals between transparent conductive glass through an external electrical field, the liquid crystals are typically aligned in a predetermined direction in the interface between the liquid crystal alignment layer and the transparent conductive glass. The degree of uniformity of the liquid crystal alignment layer is an important factor for determining the display quality of the liquid crystal display.

In the conventional method of aligning the liquid crystals, a rubbing method may be used where a polymer layer such as a polyimide is coated on a substrate such as glass and the surface is rubbed in a predetermined direction by using a fiber material such as nylon or polyester. However, minute particles or an electrostatic discharge ("ESD") may be generated when the fiber material and the polymer layer are rubbed against each other, and may cause a serious problem during the manufacturing of the liquid crystal display panel.

To solve this problem, a light alignment method where anisotropy is provided to the polymer layer by light irradiation to align the liquid crystals has been researched.

SUMMARY

The present invention provides a photoalignment agent capable of optimizing afterimages and layer strength, and a liquid crystal display including the same.

In an exemplary embodiment, a photoalignment agent includes a copolymer of i) at least one of cyclobutanedianhydride ("CBDA") and a CBDA derivative and ii) a diamine, wherein the diamine includes a first diamine including an electron donor group.

The copolymer includes i) at least one of the cyclobutanedianhydride represented by Formula A and the cyclobutanedianhydride derivative represented by Formula B and ii) the diamine includes a first diamine and a second diamine, and the second diamine does not include the electron donor group.

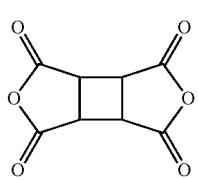

Formula A

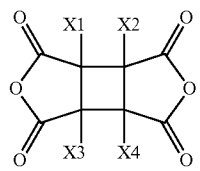

Formula B

In Formula B, X1, X2, X3, and X4 are independently hydrogen, fluorine, or an organic compound, and at least one of X1, X2, X3, and X4 is not hydrogen.

The copolymer includes at least one repeating unit represented by Formula C, Formula D, and Formula E.

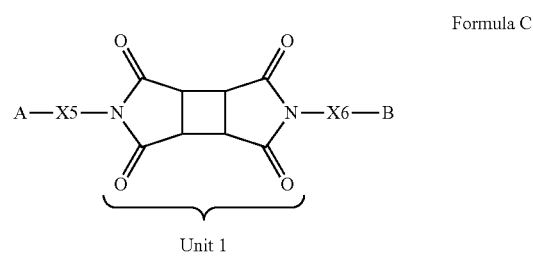

Formula C

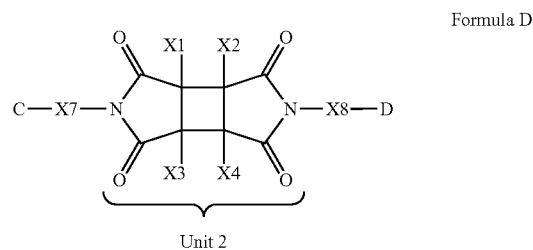

Formula D

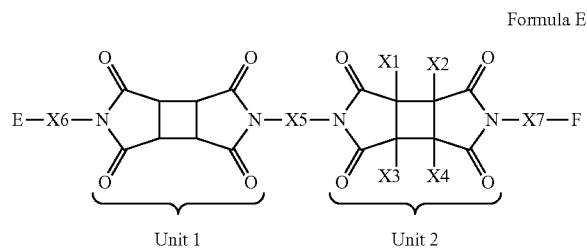

Formula E

In the above formulas, X5, X6, X7, and X8 independently represent a core structure bonded to two amino groups of the first diamine or the second diamine; A, B, C, D, E, and F are independently Unit 1 or Unit 2; and X1, X2, X3, and X4 are independently hydrogen, fluorine, or an organic compound, and at least one of X1, X2, X3, and X4 is not hydrogen.

The first diamine includes at least one compound represented by Formula F, Formula G, Formula H, Formula I, Formula J, Formula K, Formula L, and Formula M.

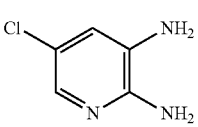

Formula F

-continued

Formula G

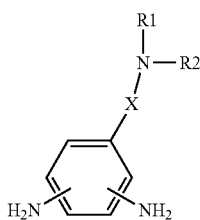

Formula H

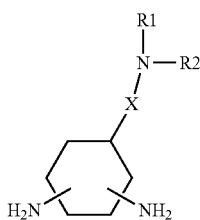

Formula I

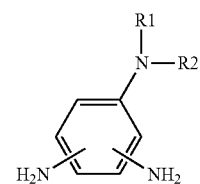

Formula J

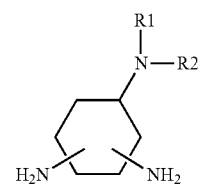

Formula K

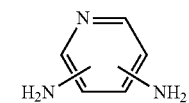

Formula L

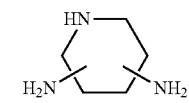

Formula M

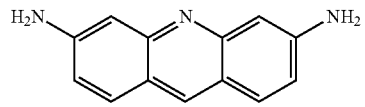

Herein, R1 and R2 are independently hydrogen or an alkyl group, and X is an alkyl group.

The second diamine is a compound represented by Formula N.

Formula N

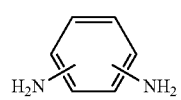

The copolymer is a compound represented by Formula O.

Formula O

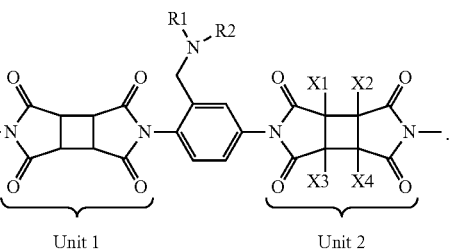

In Formula O, X1, X2, X3, and X4 are independently hydrogen, fluorine, or an organic compound, at least one of X1, X2, X3, and X4 is not hydrogen, R1 and R2 are independently hydrogen or an alkyl group, and X is an alkyl group.

The first diamine is present in an amount of about 10% to about 30% based on the total amount of the first diamine and the second diamine.

In an exemplary embodiment, a liquid crystal display includes: a first substrate; a thin film transistor disposed on the first substrate; a first electrode connected to the thin film transistor; and a first alignment layer disposed on the first electrode, wherein the first alignment layer includes a copolymer of i) at least one of a cyclobutanedianhydride and a cyclobutanedianhydride) derivative and ii) a diamine, and the diamine includes a first diamine including an electron donor group.

The cyclobutanedianhydride is represented by Formula A, the cyclobutanedianhydride derivative is represented by Formula B, and the diamine includes a first diamine and a second diamine, the first diamine includes an electron donor group, and the second diamine does not include an electron donor group.

Formula A

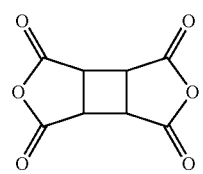

Formula B

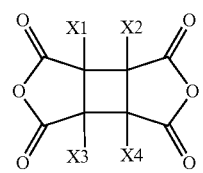

In Formula B, X1, X2, X3, and X4 are independently hydrogen, fluorine, or an organic compound, and at least one of X1, X2, X3, and X4 is not hydrogen.

The first alignment layer includes at least one repeating unit represented by Formula C, Formula D, and Formula E.

Formula C

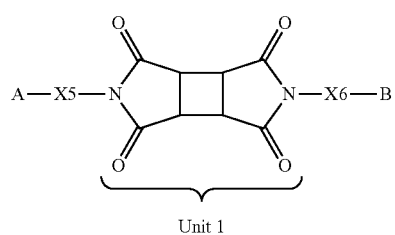

Unit 1

Formula D

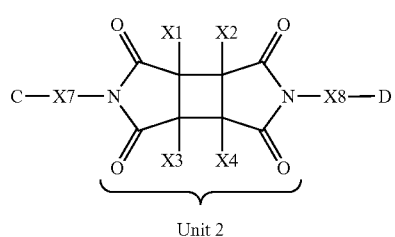

Unit 2

Formula E

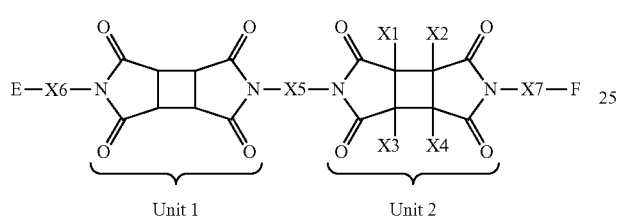

Unit 1  Unit 2

In the above formulas, X5, X6, X7, and X8 independently correspond to a core structure bonded to two amino groups of the first diamine or the second diamine; A, B, C, D, E, and F are independently Unit 1 or Unit 2; and X1, X2, X3, and X4 are independently hydrogen, fluorine, or an organic compound, and at least one of X1, X2, X3, and X4 is not hydrogen.

The first diamine includes at least one compound represented by Formula F, Formula G, Formula H, Formula I, Formula J, Formula K, Formula L, and Formula M.

Formula F

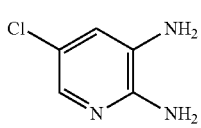

Formula G

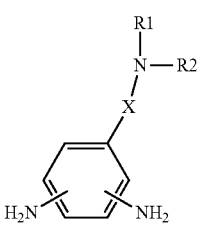

Formula H

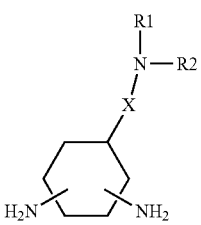

Formula I

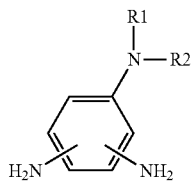

Formula J

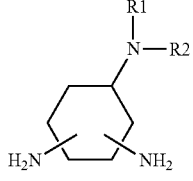

Formula K

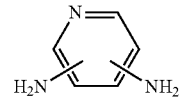

Formula L

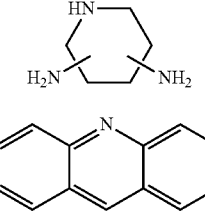

Formula M

Herein, R1 and R2 are independently hydrogen or an alkyl group, and X is an alkyl group.

The second diamine is a compound represented by Formula N.

Formula N

The copolymer is a compound represented by Formula O.

Formula O

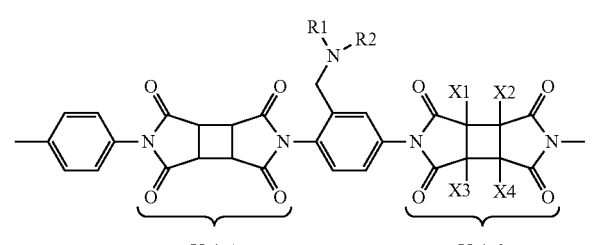

Unit 1  Unit 2

In Formula O, X1, X2, X3, and X4 are independently hydrogen, fluorine, or an organic compound, at least one of X1, X2, X3, and X4 is not hydrogen, R1 and R2 are independently hydrogen or an alkyl group, and X is an alkyl group The first diamine is present in an amount of about 10% to about 30% based on the total weight of the first diamine and the second diamine.

A second electrode is disposed on the first substrate, an insulating layer is disposed between the first electrode and the second electrode, the first electrode includes a plurality of branch electrodes, and the second electrode has a planar shape.

The plurality of branch electrodes overlap the second electrode having the planar shape.

A passivation layer is disposed between the thin film transistor and the second electrode, and the thin film transistor and the first electrode are connected by a contact hole defined in the passivation layer and the insulating layer.

A second substrate facing the first substrate, a second alignment layer disposed on the second substrate, and a liquid crystal layer disposed between the first substrate and the second substrate, the liquid crystal layer including liquid crystal molecules. The second alignment layer includes the same material as the first alignment layer.

According to an exemplary embodiment, the alignment layer includes the photoalignment agent which is a copolymer of the diamine material including the non-reactive electron donor group with the CBDA or the CBDA derivative, thereby realizing the liquid crystal display optimized with the afterimage and the layer strength.

DETAILED DESCRIPTION OF THE EMBODIMENTS

Figure 1:
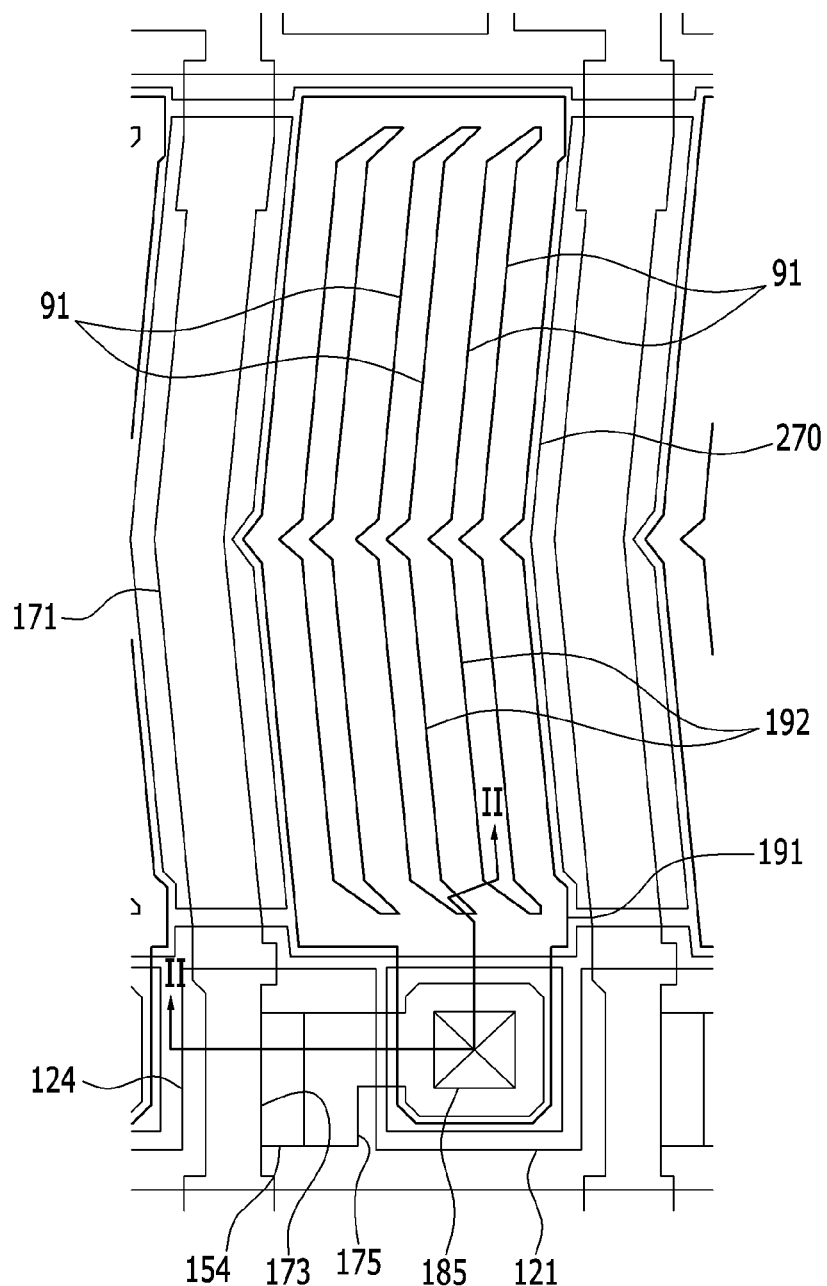
FIG. 1 is a top plan view illustrating an exemplary embodiment of a liquid crystal display.

Hereinafter, exemplary embodiments of the present invention will be described in detail with reference to the accompanying drawings, in which various embodiments are shown. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the scope of the invention to those skilled in the art.

In the drawings, the thickness of layers, films, panels, regions, etc., are exaggerated for clarity. It will be understood that when a layer is referred to as being "on" another element, it can be directly on the other element, or intervening elements may also be present therebetween. In contrast, when an element is referred to as being "directly on" another element, there are no intervening elements present. Like reference numerals designate like elements throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The material for the light alignment method is a polymer having an optical functional reactor such as azobenzene, cumarin, a chalcone, and a cinnamate, and these polymers are anisotropically reacted with the optical isomer or are photo-crosslinked by irradiation of polarized light such that the anisotropic polymer is formed on the surface of the polymer layer thereby aligning the liquid crystals in a predetermined direction.

Figure 2:
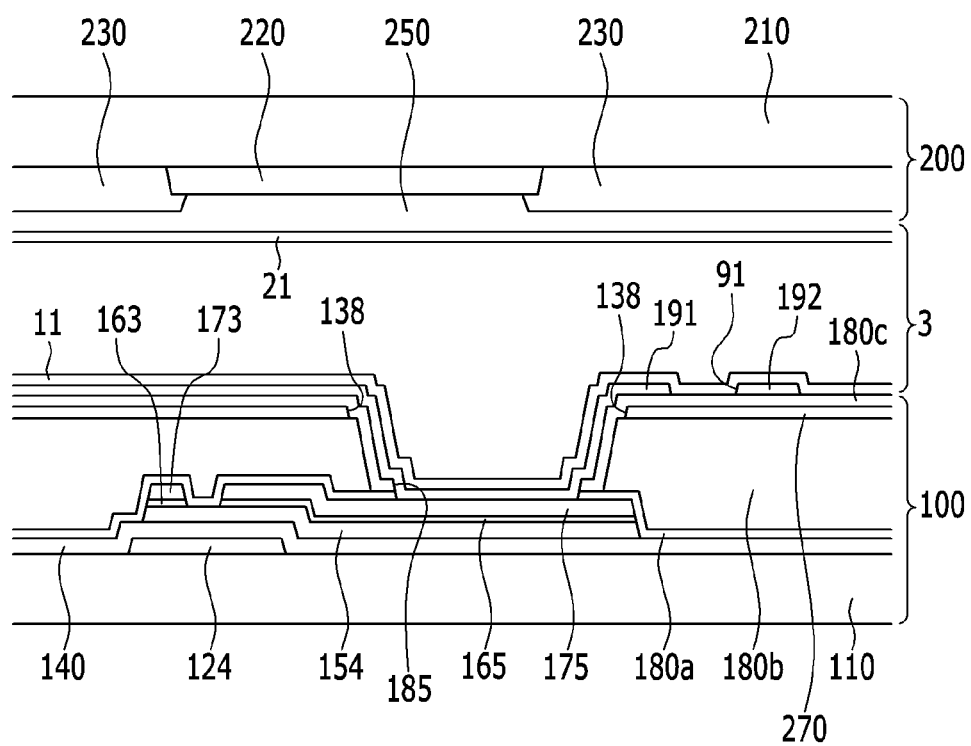
FIG. 2 is a cross-sectional view taken along line II-II of FIG. 1.

FIG. 1 is a top plan view illustrating an exemplary embodiment of a liquid crystal display. FIG. 2 is a cross-sectional view taken along cut line II-II of FIG. 1.

Referring to FIG. 1 and FIG. 2, the exemplary liquid crystal display includes a lower display panel 100 and an upper display panel 200 facing each other, and a liquid crystal layer 3 injected therebetween.

First, the lower display panel 100 will be described.

A gate conductor including a gate line 121 is formed on a first substrate 110 formed of transparent glass, plastics, or the like.

The gate line 121 includes a gate electrode 124, and a wide end portion (not shown) for connection with another layer or an external driving circuit. The gate line 121 may be made of an aluminum-based metal such as aluminum (Al) or an aluminum alloy, a silver-based metal such as silver (Ag) or an silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 formed of a silicon nitride (SiNx), a silicon oxide (SiOx), or the like is formed on the gate line 121. The gate insulating layer 140 may have a multilayered structure including at least two insulating layers having different physical properties.

A semiconductor layer 154 made of amorphous silicon, polysilicon, or the like, is disposed on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon in which an n-type impurity such as phosphorus is doped at a high concentration, or a silicide. The ohmic contacts 163 and 165 may form a pair to be disposed on the semiconductor layer 154. In the case where the semiconductor 154 is an oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion (not shown) for connection with another layer or the external driving circuit. The data line 171 transports a data signal and mainly extends in a vertical direction to cross the gate line 121.

In this case, the data line 171 may have one or more bent portions having a bent shape in order to obtain maximum transmittance of the liquid crystal display, and the bent portions may meet each other in an intermediate region of a pixel region to form a V shape.

The source electrode 173 is a portion of the data line 171, and is disposed on the same line as the data line 171. The drain electrode 175 is formed to extend in parallel to the source electrode 173. Accordingly, the drain electrode 175 is parallel to a portion of the data line 171.

The gate electrode 124, the source electrode 173, and the drain electrode 175 form one thin film transistor ("TFT") together with the semiconductor layer 154, and a channel of the thin film transistor is formed in a portion of the semiconductor layer 154 between the source electrode 173 and the drain electrode 175.

The exemplary liquid crystal display may include the source electrode 173 disposed on the same line as the data line 171 with the drain electrode 175 extending in parallel to the data line 171 in order to increase a width of the thin film transistor without increasing the occupying area of the data conductor, and thus an aperture ratio of the liquid crystal display may be increased.

It is preferable that the data line 171 and the drain electrode 175 be made of a refractory metal such as molybdenum, chromium, tantalum, titanium, or an alloy thereof, and the data line 171 and the drain electrode 175 may have a multilayered structure (not shown) including a refractory metal layer and a low resistance conductive layer. Examples of the multilayered structure may include a double layer of a chromium or molybdenum (alloy) lower layer and an aluminum (alloy) upper layer, and a triple layer of a molybdenum (alloy) lower layer, an aluminum (alloy) intermediate layer, and a molybdenum (alloy) upper layer.

A first passivation layer 180a is disposed on exposed portions of the data conductors 171, 173, and 175, the gate insulating layer 140, and the semiconductor 154. The first passivation layer 180a may be formed of an organic insulating material, an inorganic insulating material, or the like.

A second passivation layer 180b is formed on the first passivation layer 180a. The second passivation layer 180b may be formed of an organic insulator.

The second passivation layer 180b may be a color filter. In the case where the second passivation layer 180b is the color filter, the second passivation layer 180b may intrinsically display any one of the primary colors. Examples of the primary colors may include three primary colors such as red, green, and blue, yellow, cyan, and magenta, or the like. Although not shown in the drawings, the color filter may further include a color filter displaying a mixed color of the primary colors or white in addition to the primary colors. In the case where the second passivation layer 180b is the color filter, a color filter 230 may be omitted in the upper display panel 200 as will be described later. Differently from the present exemplary embodiment, when the second passivation layer 180b is formed of the organic insulating material, the color filter (not shown) may be formed between the first passivation layer 180a and the second passivation layer 180b.

A common electrode 270 is disposed on the second passivation layer 180b. The common electrode 270 may have a planar shape, may be formed of an integrated plate on an entire surface of the substrate 110, and has an opening 138 disposed in a region corresponding to a periphery of the drain electrode 175. That is, the common electrode 270 may have a plate shape.

Common electrodes 270 disposed in adjacent pixels may be connected to each other to receive a common voltage having a predetermined size supplied from the outside of a display region.

An insulating layer 180c is disposed on the common electrode 270. The insulating layer 180c may be formed of an organic insulating material, an inorganic insulating material, or the like.

A pixel electrode 191 is disposed on the insulating layer 180c. The pixel electrode 191 includes a curved edge that is almost parallel to the bent portion of the data line 171. The pixel electrode 191 has a plurality of cutouts 91, and includes a plurality of branch electrodes 192 disposed between the adjacent cutouts 91.

The pixel electrode 191 is a first field generating electrode or a first electrode, and the common electrode 270 is a second field generating electrode or a second electrode. The pixel electrode 191 and the common electrode 270 may form a fringe field.

A first contact hole 185 is defined in the first passivation layer 180a, the second passivation layer 180b, and the insulating layer 180c, and exposes the drain electrode 175. The pixel electrode 191 is physically and electrically connected to the drain electrode 175 through the contact hole 185 to receive a voltage from the drain electrode 175.

A first alignment layer 11 is formed on the pixel electrode 191 and the insulating layer 180c. The first alignment layer 11 includes a photoalignment layer.

In the present exemplary embodiment, the first alignment layer 11 includes a copolymer obtained by polymerizing at least one of cyclobutanedianhydride (CBDA) and a cyclobutanedianhydride (CBDA) derivative with a diamine. In exemplary embodiments, the first alignment layer 11 may be formed by co-polymerization of i) at least one of the cyclobutanedianhydride (CBDA) represented by Formula A and the cyclobutanedianhydride (CBDA) derivative represented by Formula B and ii) a diamine.

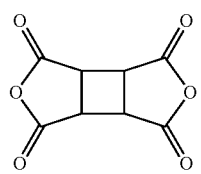

Formula A

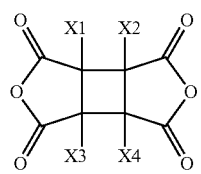

Formula B

In Formula B, X1, X2, X3, and X4 are independently hydrogen, fluorine, or an organic compound, and at least one of X1, X2, X3, and X4 is not hydrogen. The organic compound may include an alkyl group or alkoxyl group with a carbon number of 1 to 6. However, the organic compound is not particularly limited thereto.

In an exemplary embodiment, the diamine may include an electron donor group. Specifically, the diamine including an electron donor group includes at least one compound represented by Formula F, Formula G, Formula H, Formula I, Formula J, Formula K, Formula L, and Formula M.

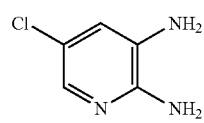

Formula F

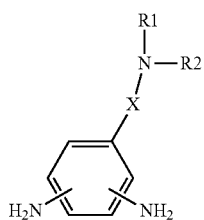

Formula G

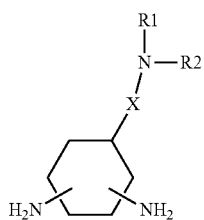

Formula H

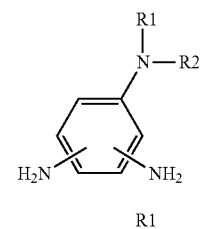

Formula I

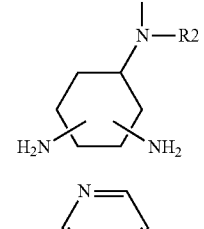

Formula J

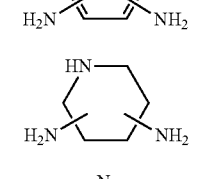

Formula K

Formula L

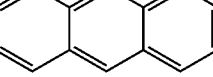

Formula M

As defined herein, R1 and R2 are independently hydrogen or an alkyl group, and X is an alkyl group.

In an exemplary embodiment, the diamine may include a first diamine and a second diamine. The first diamine may be a diamine including the described electron donor group. The second diamine may also be a diamine including the electron donor group. In an exemplary embodiment, the second diamine does not include an electron donor group.

In an exemplary embodiment, when a total number of the first diamine is n and a total number of the second diamine is m, n+m=100, and n is about 10 to about 30.

In the present exemplary embodiment, the second diamine may be a compound represented by Formula N.

Formula N

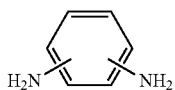

The second diamine as represented by Formula N, may be an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,2-bis[4-(4-aminophenoxy)phenyl]hexafluoropropane, a cycloaliphatic diamine such as bis(4-aminocyclohexyl)methane and bis(4-amino-3-methylcyclohexyl)methane, an aliphatic diamine such as tetramethylenediamine and hexamethylenediamine, or the like. However, the second diamine is not limited thereto.

In the an exemplary embodiment, the first alignment layer 11 may include a repeating unit represented by Formula C, Formula D, or Formula E.

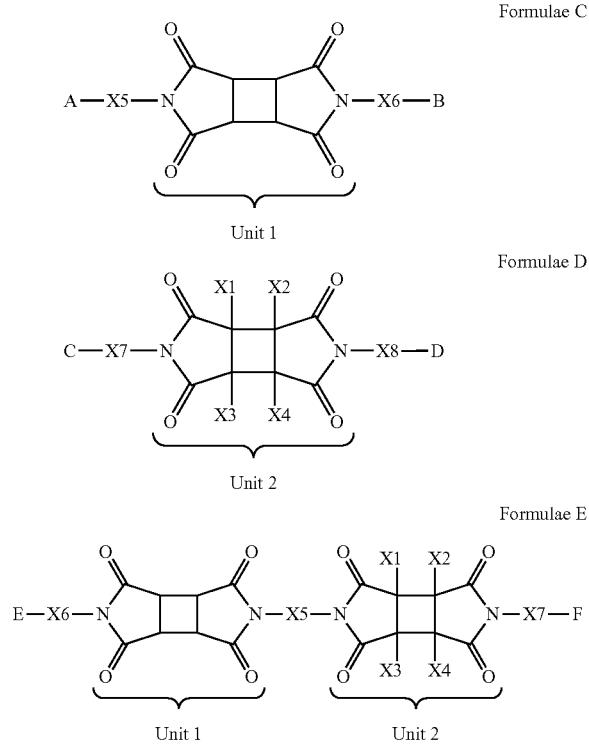

Formulae C, Formulae D, Formulae E

In above Formula C, Formula D, and Formula E, X5, X6, X7, and X8 independently correspond to a core portion of the first diamine or the second diamine, where the core portion is bonded to the amino groups (—NH2) of the first diamine or the second diamine; A, B, C, D, E, and F are independently Unit 1 or Unit 2, and X1, X2, X3, and X4 are independently hydrogen, fluorine, or an organic compound, and at least one of X1, X2, X3, and X4 may not be hydrogen.

Herein, a method of forming the alignment layer will be described.

The photoalignment agent is formed by co-polymerizing i) at least one of the cyclobutanedianhydride (CBDA) and the cyclobutanedianhydride (CBDA) derivative with ii) the first diamine and the second diamine. The photoalignment agent is then coated on the pixel electrode 191.

In an exemplary embodiment, the photoalignment agent is a material forming the first alignment layer 11. Accordingly, the exemplary photoalignment agent demonstrates improved affinity with a polarity solvent used in the polymerization process due to the inclusion of the first diamine including the electron donor group. If the affinity with the polarity solvent is improved, the imidization is high in the polymerization process and as a result, the imidization ratio may be finally improved. As the imidization ratio is increased, the layer strength of the alignment layer may be subsequently increased.

Thereafter, the applied photoalignment agent is baked. The baking step may be performed through two steps of prebaking and hard baking.

The first alignment layer 11 may then be formed by radiating polarized light on the photoalignment agent. In this case, ultraviolet light having a range of about 240 nanometers (nm) or more and about 380 nanometers or less may be used. In an exemplary embodiment, ultraviolet light of 254 nanometers may be used. The first alignment layer 11 may be baked once more in order to increase the alignment properties.

Figure 3:
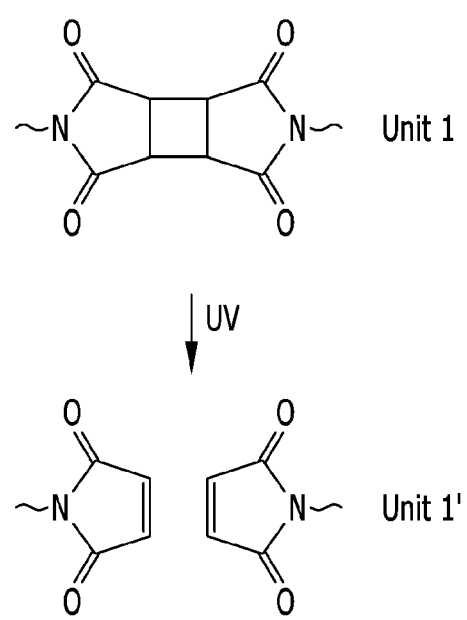
FIG. 3 is a structure-based formula illustrating the decomposition of polyimide in an exemplary alignment layer following exposure to ultraviolet (UV) irradiation.
Figure 4:
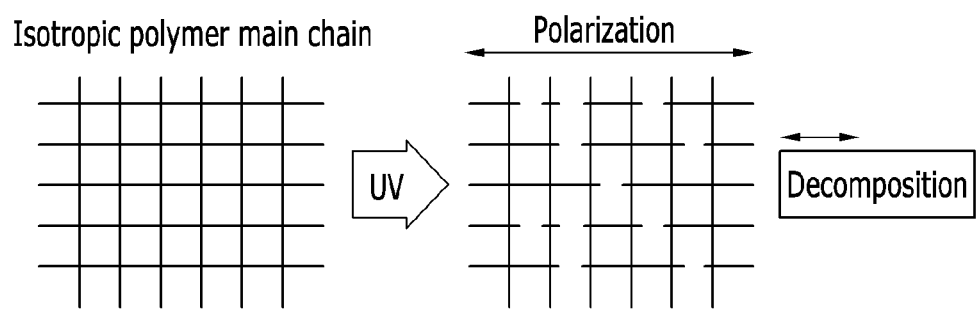
FIG. 4 is a view illustrating the change from isotropy to anisotropy in the exemplary alignment layer.

FIG. 3 is a structure-based formula illustrating the decomposition of polyimide in the exemplary alignment layer. FIG. 4 is a view illustrating a change process from isotropy to anisotropy in the exemplary alignment layer.

Referring to FIG. 3, cyclobutanedianhydride (CBDA) and diamine are subjected to the polymerization reaction through a baking process to form a polyimide (Unit 1), and UV light is irradiated on the polyimide to form maleimide (Unit 1').

FIG. 4 illustrates that a polymer main chain including the polyimide (Unit 1) illustrated in FIG. 3, is decomposed to be aligned as the result of irradiation of the polyimide with polarized UV light. Referring to FIG. 4, if polarized UV light is irradiated on an isotropic polymer main chain, photodecomposition occurs in a polarization direction (e.g. an absorption axis direction), and thus a photoalignment layer may be aligned in a direction that is perpendicular to the polarization. If an exposure amount is excessively small, the decomposition efficiency is low, and the alignment property may deteriorate. On the contrary, if the exposure amount is excessively increased, the decomposition efficiency is increased, and decomposition occurs in another direction in addition to the polarization direction, and thus the alignment property may deteriorate.

Now, referring back to FIGS. 1 and 2, the upper display panel 200 will be described.

A light blocking member 220 is formed on a second substrate 210 made of transparent glass, plastics, or the like. The light blocking member 220 is called a black matrix and prevents light leakage.

Further, a plurality of color filters 230 are also formed on the second substrate 210. In the case where the second passivation layer 180b of the lower display panel 100 is the color filter, the color filter 230 of the upper display panel 200 may be omitted. The light blocking member 220 of the upper display panel 200 may also be formed in the lower display panel 100.

An overcoat 250 is formed on the color filter(s) 230 and the light blocking member 220. The overcoat 250 may be made of an (organic) insulator, and prevents exposure of the color filter 230 and provides a flat surface. The overcoat 250 may be omitted.

A second alignment layer 21 is formed on the overcoat 250. The second alignment layer 21 includes a photoreactive material. The second alignment layer 21 may be formed of the same material as the first alignment layer 11 using the same method as described above for the first alignment layer 11.

The liquid crystal layer 3 may include a liquid crystal material having negative or positive dielectric anisotropy.

Liquid crystal molecules of the liquid crystal layer 3 are arranged so that a longitudinal axis direction thereof is parallel or perpendicular to the display panels 100 and 200.

The pixel electrode 191 receives a data voltage from the drain electrode 175, and the common electrode 270 receives a common voltage of a predetermined size from a common voltage applying unit disposed outside of the display region.

The pixel electrode 191 and the common electrode 270 act as field generating electrodes. The liquid crystal molecules of the liquid crystal layer 3 disposed on the pixel electrode 191 and the field electrode 270, are rotated in a direction parallel to the direction of the electric field generated by the pixel electrode 191 and the common electrode 270. The polarization of light passing through the liquid crystal layer is changed according to the determined rotation direction of the liquid crystal molecules.

In this way, by forming the two field generating electrodes corresponding to the pixel electrode 191 and the common electrode 270 on one display panel 100, transmittance of the liquid crystal display may be increased and a wide viewing angle may be implemented.

According to an exemplary embodiment, the common electrode 270 has a planar shape and the pixel electrode 191 has a plurality of branch electrodes. In another exemplary embodiment, the pixel electrode 191 may have the planar shape and the common electrode 270 may have the plurality of branch electrodes.

The present invention can be applied to all other cases where two field generating electrodes overlap each other on the first substrate 110 while the insulating layer is interposed therebetween, the first field generating electrode formed beneath the insulating layer has a planar shape, and the second field generating electrode formed on the insulating layer has the plurality of branch electrodes.

Figure 5:
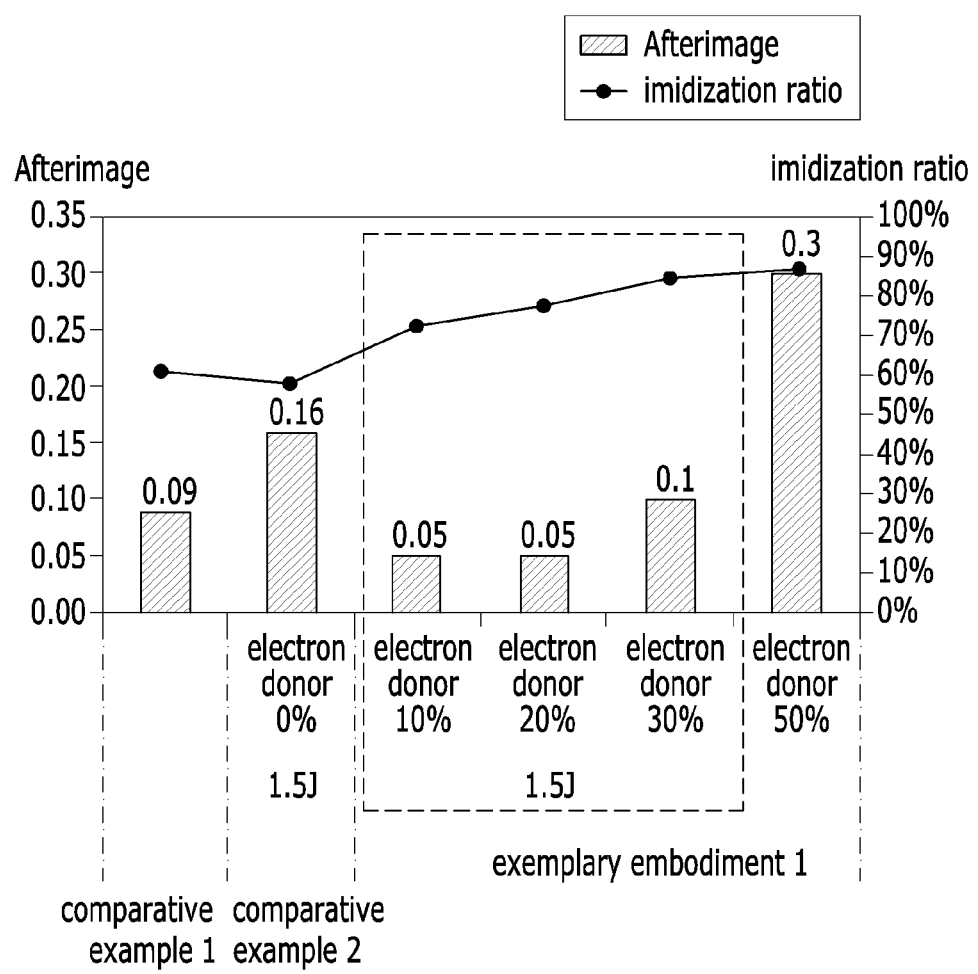
FIG. 5 is a graph showing an afterimage and an imidization ratio for Comparative Example 1, Comparative Example 2, and Exemplary Embodiment 1 of the present invention.

FIG. 5 is a graph showing an afterimage and an imidization ratio according to Comparative Example 1, Comparative Example 2, and an exemplary embodiment of the present invention.

In Comparative Example 1, the alignment layer is formed using a conventional rubbing method. In Comparative Example 2, the alignment layer is formed using only the second diamine without the electron donor group in the photoalignment agent polymerization process. In Exemplary Embodiment 1, the alignment layer is formed using the first diamine group including the electron donor group in the photoalignment agent polymerization process, in accordance with the present invention.

Referring to FIG. 5, the afterimage in Comparative Example 1 is relatively low at 0.09 degree; however, a problem due to the rubbing is generated. The afterimage in Comparative Example 2 is 0.16 degree, while the afterimage in Exemplary Embodiment 1 is less than 0.1 degree. Also, the imidization ratio is more than 70% for Exemplary Embodiment 1, such that the alignment layer strength is improved. Further, when the percentage of the first diamine including an electron donor group is more than 50%, the afterimage degree is very high. Accordingly, in the exemplary photoalignment layer it is advantageous that the amount of first diamine is about 10% to about 30% of the total diamine content in the photoalignment agent.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A photoalignment agent comprising:
    a copolymer of i) at least one of a cyclobutanedianhydride and a cyclobutanedianhydride derivative, and ii) a diamine,
    wherein the diamine comprises a first diamine, and wherein a residual structure of the first diamine in the copolymer includes a group to donate an unshared pair of electrons.

2. The photoalignment agent of claim 1, wherein the cyclobutanedianhydride is represented by Formulae A, the cyclobutanedianhydride derivative is represented by Formulae B, and the diamine further comprises a second diamine, wherein a residual structure of the second diamine in the copolymer does not include a group to donate an unshared pair of electrons:

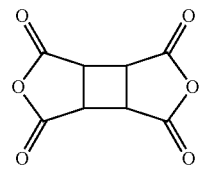

Formula A

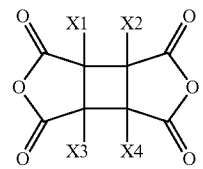

Formula B wherein X1, X2, X3, and X4 are independently hydrogen, fluorine, or an organic compound, and at least one of X1, X2, X3, and X4 is not hydrogen.

3. The photoalignment agent of claim 2, wherein the copolymer comprises at least one repeating unit represented by Formula C, Formula D, and Formula E:

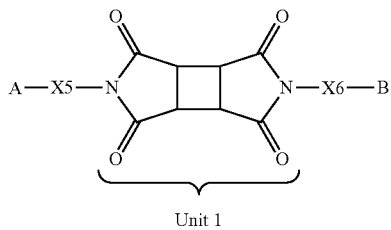

Formula C

-continued

Formula D

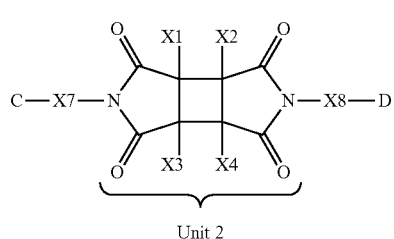

Unit 2

Formula E

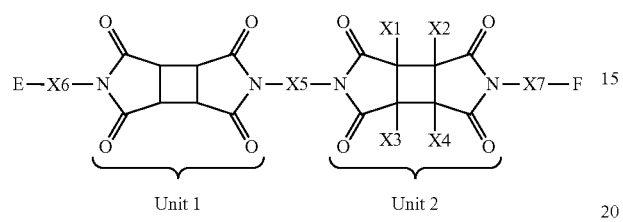

Unit 1    Unit 2 wherein X5, X6, X7, and X8 independently represent the residual structure of the first diamine or the residual structure of the second diamine; A, B, C, D, E, and F are independently unit 1 or unit 2; and X1, X2, X3, and X4 are independently hydrogen, fluorine, or an organic compound, and at least one of X1, X2, X3, and X4 is not hydrogen, Unit 1

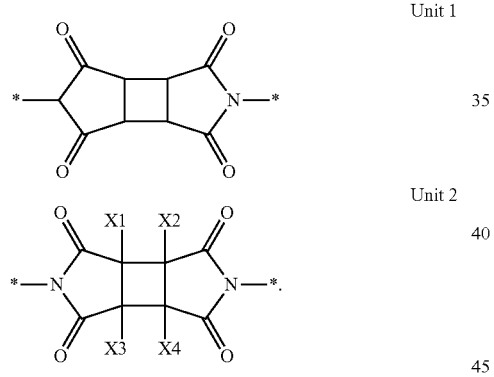

Unit 2

4. The photoalignment agent of claim 3, wherein the first diamine comprises at least one compound represented by Formula F, Formula G, Formula H, Formula I, Formula J, Formula K, Formula L, and Formula M:

Formula F

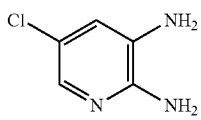

Formula G

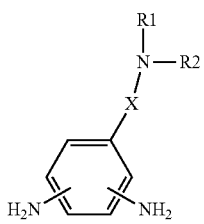

Formula H

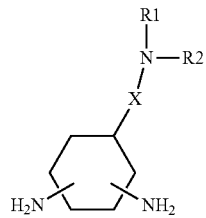

Formula I

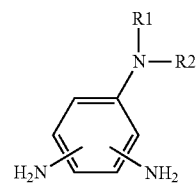

Formula J

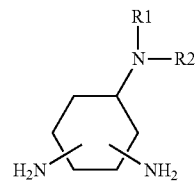

Formula K

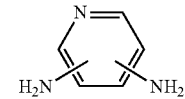

Formula L

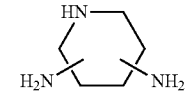

Formula M

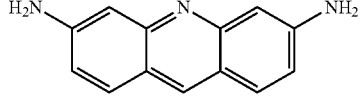

wherein R1 and R2 are independently hydrogen or an alkyl group, and X is an alkyl group.

5. The photoalignment agent of claim 4, wherein the second diamine is a compound represented by Formula N:

Formula N

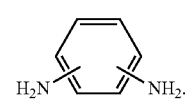

6. The photoalignment agent of claim 5, wherein the copolymer is a compound represented by Formula O:

Formula O

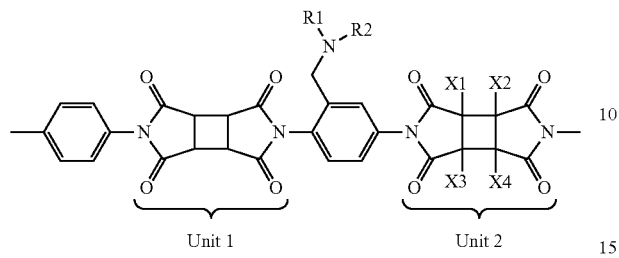

wherein X1, X2, X3, and X4 are independently hydrogen, fluorine, or an organic compound, and at least one of X1, X2, X3, and X4 is not hydrogen; R1 and R2 are independently hydrogen or an alkyl group; and X is an alkyl group.

7. The photoalignment agent of claim 2, wherein the first diamine is present in an amount of about 10% to about 30% based on a total amount of the first diamine and the second diamine.

* * * * *